Dec. 8, 1936.     J. A. WALLER     2,063,068
LAWN MOWER
Filed Dec. 17, 1934     2 Sheets-Sheet 2
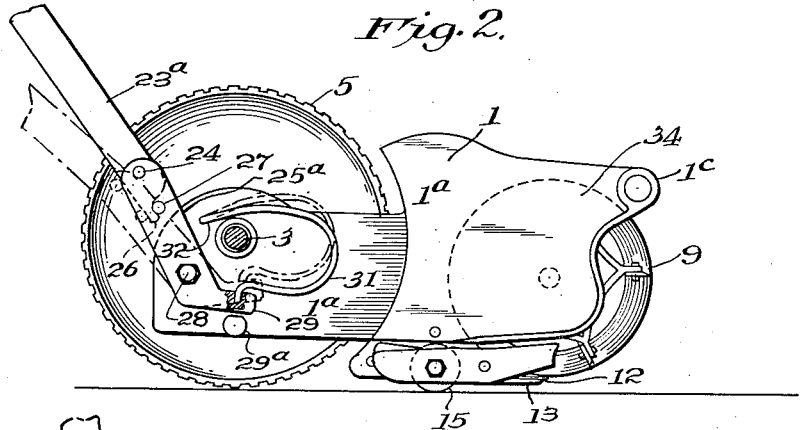
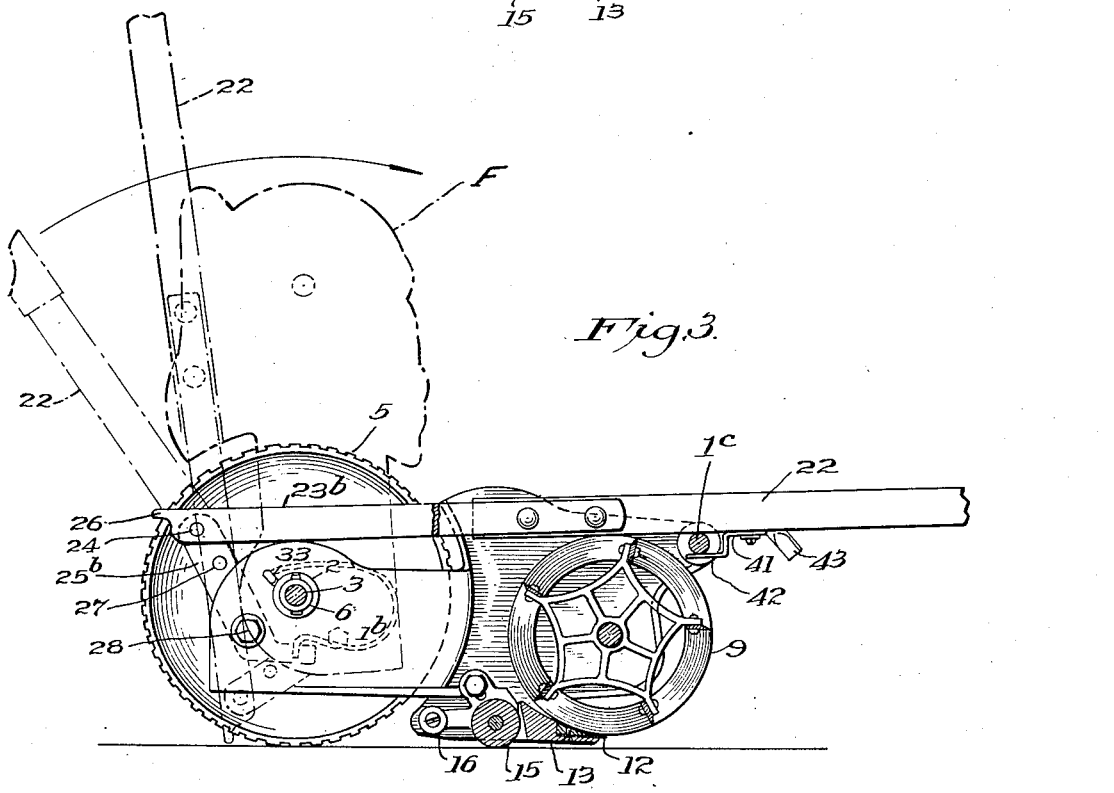
INVENTOR
John A. Waller,
BY *(signatures)*
ATTORNEYS Patented Dec. 8, 1936

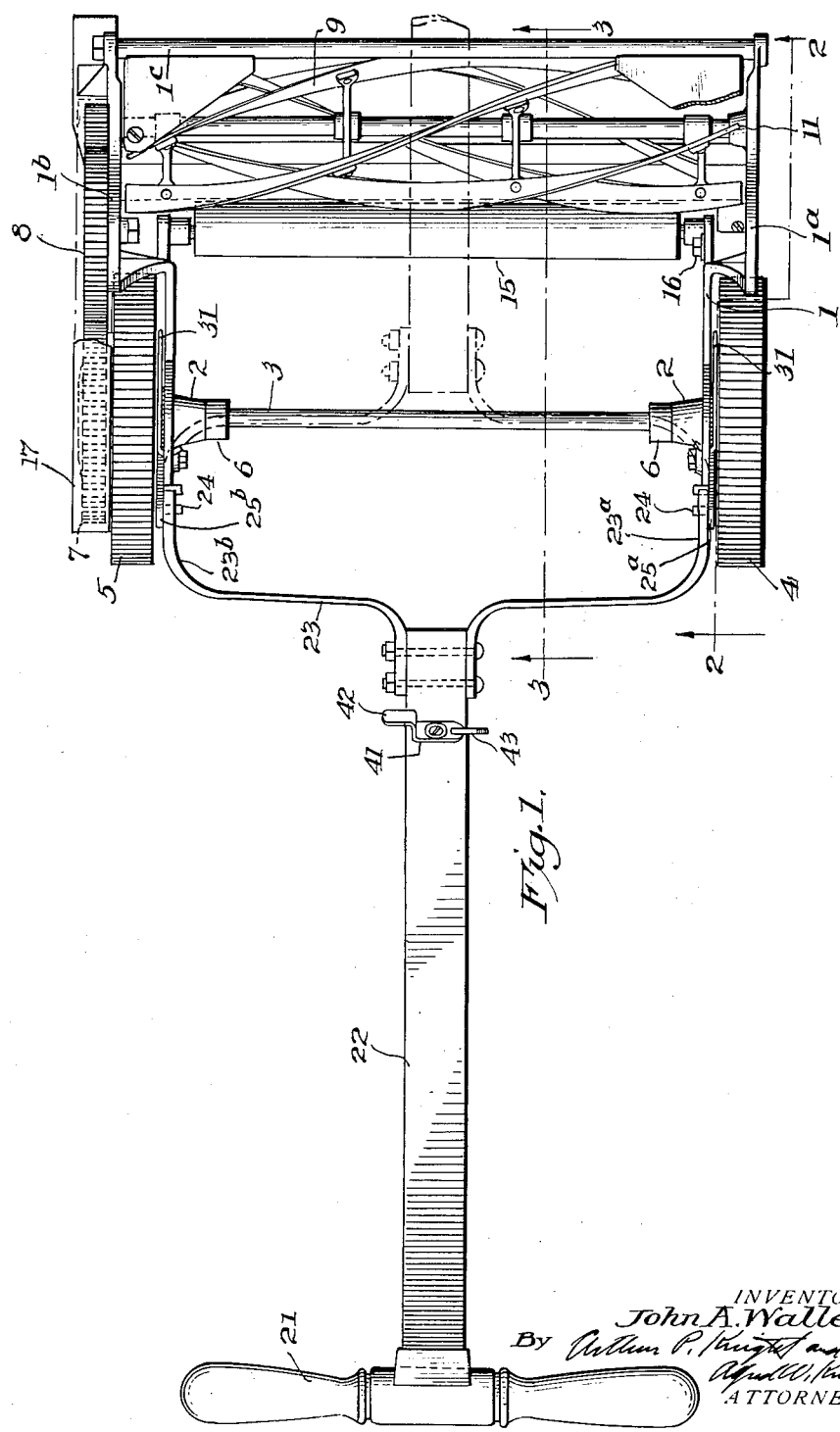

2,063,068

UNITED STATES PATENT OFFICE 2,063,068

LAWN MOWER

John A. Waller, Beverly Hills, Calif.

Application December 17, 1934, Serial No. 757,740

7 Claims. (Cl. 56—252)

This invention relates to a device for cutting grass, lawn and the like, and particularly to an improved form of lawn mower device provided with an advantageous form of handle means and handle mounting means which provides for uniform cutting operation of the device under varying operating conditions.

The device of the present invention may comprise in general a rotatable cutting element mounted at the forward end of a suitable supporting structure and provided with operative engagement with a pair of driving wheels located rearwardly thereof, and a spring-biased handle means pivotally mounted on said supporting structure adjacent and below the axis of rotation of said driving wheels and extending rearwardly in position to be grasped by a person standing erect. The pivotal mounting of said handle means is preferably of such nature that said handle means may be folded forwardly and brought to rest against the supporting structure at the forward end of the device and secured thereto.

One of the principal objects of the invention is to provide a lawn mower having a spring-biased driving handle pivotally mounted to the lawn mower in such position that during the operation of said mower the forward end thereof which carries the rotatable cutter element is biased resiliently upwardly.

A further object of the invention is to provide a handle means associated with a lawn mower supporting structure which may be folded out of operating position whereby the lawn mower may be caused to encompass a minimum space and thus be conveniently stored.

A further object of the invention is to provide a handle means for a lawn mower which is spring-biased to effect a lightening of the forward end of said mower in such manner that substantially the same degree of spring-biasing is obtained independent of the angular position of the handle means due to its being grasped by persons of different height.

Other objects of the invention will be brought out in the following description of a preferred embodiment of the device, or will be apparent therefrom.

The accompanying drawings show the device of the present invention and referring thereto:

Fig. 1 is a plan view of the device showing the operating and folding positions of the handle means;

Fig. 2 is a partly sectional view thereof taken on line 2—2 in Fig. 1 and illustrating the action and mounting of the spring-biasing means; and Fig. 3 is a transverse sectional view taken on line 3—3 in Fig. 1, showing the folded position of the handle means.

Referring to the drawings, the device may comprise a supporting structure generally designated by the numeral 1 comprising side members 1a and 1b and a transverse tie rod 1c. The members 1a and 1b are provided adjacent their rearward ends with a boss 2 through which a shaft 3 may extend, carrying the driving wheels 4 and 5, suitable set collars 6 being provided to locate said shaft transversely. The right-hand wheel 4 may be positively secured to the shaft 3 and suitable ratchet means may be provided within the hub of the wheel 5 and its driving gear 7, according to conventional practice, to provide for driving the associated gear train 8 and the rotatable cutter 9 on movement of the mower forwardly, while disengaging said gear train upon movement of the mower rearwardly. The cutter 9 is rotatably mounted in suitable bearings 11 provided on the side frame members 1a and 1b, and substantially directly below the axis of said cutter 9 I provide a rearwardly extending stationary cutter 12 provided with a backing plate 13 suitably secured to the side frame members. Rearwardly of the fixed cutter 12, I provide a suitable roller 15 rotatably mounted on the supporting structure as at 16. A suitable cover or the like 17 may be provided exteriorly of the gear train 8 to protect the same from damage and maintain the same in place, and may be suitably secured to the supporting structure. The handle means may comprise a cross member 21 adapted to be grasped in the hands of a person operating the device, a shaft portion 22 and a bifurcated portion 23 having end portions 23a and 23b extending interiorly of the side frame members 1a and 1b and pivotally attached as at 24 to arms 25a and 25b pivotally secured to the side frame members 1a and 1b, the portions 23a and 23b being provided with lugs members 26 at their lower ends and the arms 25a and 25b being provided with stop means 27 in position to be engaged by said lug means 26 after the manner shown in Fig. 2 when the handle means is in operative position. The pivotal mounting of the arms 25a and 25b to the side frame members is made at a point 28 rearwardly and downwardly disposed with respect to the axis of the driving wheels as defined by the shaft 3. The arms 25a and 25b extend forwardly of the pivotal mounting 28 and terminate in lug portions 29 adapted to receive one end of U-shaped spring members 31 secured to the side frame members as at 32, the attachment of the springs 31 to the frame members being easily obtained by passing one end thereof through a slot 33 in said frame members, as shown in Fig. 3. Suitable stop means are provided as at 29a on the side frame members for engaging the lugs 29 to limit the forward rotation of the arms 25a and 25b.

Referring particularly to Fig. 2, the handle means may be moved from the position shown in full lines to a position such as shown in dot-dash lines during operation of the device, dependent upon the position the operator chooses to hold the cross member 21, and the presently described spring means 31 is preferably so mounted that substantially the same degree of upward biasing of the forward portion 34 of the lawn mower will be obtained in any angular position of the handle means during operation of the device, the said spring means is so mounted that as the handle means and its associated arm is moved from the full line position to the dot-dash line, pressing the said spring 31 from its full line position to its dot-dash line position, the angle of application of the compressive force of said spring on said arms is altered in proportion to the increase in compression of said spring whereby the resultant effect or turning moment on said arms is maintained substantially equivalent.

The springs 31 are of such strength as to obtain a degree of upward biasing of the cutter and of the mower dependent upon the service to which the mower is to be put. I have found, when employing proportions substantially those shown in the drawings, that for ordinary lawn use said springs should exert a lifting effect upon the cutter such as to produce an apparent weight of about two pounds to the front of the mower. Due to the pivots 28 for the handle means being placed downwardly and rearwardly of the axle 3, the force applied to the handle in driving the mower over the area to be cut is partly divided into a forward horizontal force and a downward force tending to cause a suitable driving engagement between the cut surface and the driving wheels. If an area of difficultly cut grass is encountered, more force will have to be exerted at the handle to drive the mower, which results in a greater downward pressure of the driving wheels on the cut surface, but the additional force required does not act to increase the apparent weight of the cutting end of the mower. In the conventional lawn mower construction, due to the disposition of the point of attachment of the handle means to the mower frame, the greater the force on the handle the more the cutter portion of the mower is forced against the lawn, causing, due to variations in the applied force, the grass to be cut quite short under some conditions and less short under others. With the use of the present apparatus the tendency for the cutter to dig in when the going is hard is counter-balanced by the application of the downward component of driving force at a point rearwardly and downwardly from the axis of the driving wheels, about which the mower frame is pivotally mounted.

When the handle means is folded forwardly about the pivot 24 it may be caused to rest on the transverse member 1c as shown in Fig. 3, and I preferably provide a pivotally mounted catch member 41 provided with a projecting portion 42 and a wing portion 43 which may be rotated to cause the portion 42 to engage the under side of the member 1c and thus position the handle means in folded relation to the mower, either by folding the handle forwardly or by folding the mower rearwardly toward the handle. The mower may then be pushed about, rotating the wheels in rearward direction in which case the rotatable cutter 9 will not be operated, and may be leaned against a wall or the like in some such position as indicated by the dot-dash outline F in Fig. 3, in which position it will be seen that the lawn mower occupies a comparative small floor space as compared to the conventional lawn mower.

This application is filed as a continuation-in-part of my co-pending application, Serial Number 630,831, filed August 29, 1932.

I claim:

1. In a lawn mower provided with a transversely extending axle member defining an axis, driving wheels mounted on the respective ends of said axle member and rotatable about said axis, a supporting structure mounted on said axle member for pivotal movement about said axis and having a portion extending forwardly of said axis, cooperating fixed and rotatable cutter means mounted on said supporting structure and extending transversely there-across at the forward end thereof, a handle structure which comprises: handle means pivotally mounted on said supporting structure adjacent but downwardly and rearwardly of said axis and extending upwardly and rearwardly therefrom, and spring means having one end secured to said supporting structure at a point removed from said axis and having its other end resiliently engaging said handle means, said spring means being positioned to bias the forward end of said supporting structure including said fixed and rotatable cutter means upwardly about said axis upon movement of the rearwardly extending portion of said handle means in a downward direction.

2. The invention set forth in claim 1, said handle means comprising a lower portion pivotally mounted on said supporting structure and an upper portion pivotally connected to said lower portion at a position upwardly and rearwardly removed from the point of pivotal mounting of said lower portion, said upper portion being movable forwardly of the device about such pivotal connection into engagement with the forward portion of said mower in folded position.

3. The invention set forth in claim 1, said spring means being so positioned with respect to said common axis and the point of pivotal mounting of said handle means on said structure that the turning moment of said spring means on the forward end of said structure is maintained substantially equivalent in all angular positions of said handle means.

4. In a device of the character described, comprising a transversely extending axle member defining an axis, driving wheels mounted on said axle member and adapted for rotation about said axis, two oppositely side members mounted on said axle member for pivotal movement about said axis and constituting a supporting structure having portions extending forwardly of said axle member, a rotatable cutting member mounted transversely across and between the forward ends of said side members, a stationary cutting member secured to said structure positioned below said rotatable cutting member and in engagement therewith and means operatively associating said rotatable cutting member with said driving wheels, a handle structure which comprises: handle means pivotally mounted on said supporting structure at a position rearwardly and downwardly removed from said axis and having a portion extending upwardly and rearwardly therefrom, spring means mounted on said supporting structure at a position removed from said axis, resiliently engaging said handle means and operable to bias the forward end of said supporting structure upwardly about said axis upon pivotal movement of said rearwardly extending portion of said handle means in a downward direction.

5. The device set forth in claim 4, said handle means having portions extending downwardly past the pivotal engagement thereof; and said resilient spring means being secured to said structure in position to engage the downwardly extending portions of said handle means.

6. The device set forth in claim 4, and comprising in addition: hinge means in said handle means adjacent but upwardly removed from the position of the pivotal mounting thereof, said hinge means including a rigid member positioned to engage stop means on said handle means to effect a rigid connection of the portions of said handle means on opposite sides of said hinge means upon downward pressure on said handle means at points upwardly removed from the position of said hinge means, while providing free forward movement of the portion of said handle means upwardly of said hinge means with respect to said structure.

7. In a lawn mower provided with a transversely extending axle member defining an axis, driving wheels mounted on said axle member and adapted for rotation about said axis, a supporting structure mounted on said axle member for pivotal movement about said axis and having a portion extending forwardly thereof, cooperating fixed and rotatable cutter means mounted on said structure and extending transversely thereacross at the forward end thereof, a handle structure which comprises: handle means pivotally mounted on said supporting structure adjacent said common axis and having a portion extending upwardly and rearwardly therefrom, and spring means mounted on said supporting structure at a point removed from said axis resiliently engaging said handle means, and positioned to bias the forward end of said supporting structure upwardly about said axis upon movement of the rearwardly extending portion of said handle means in a downward direction, said spring means comprising a U-shaped spring member having one end attached to said supporting structure and the other end engaging said handle means.

JOHN A. WALLER.